UNITED STATES PATENT OFFICE.

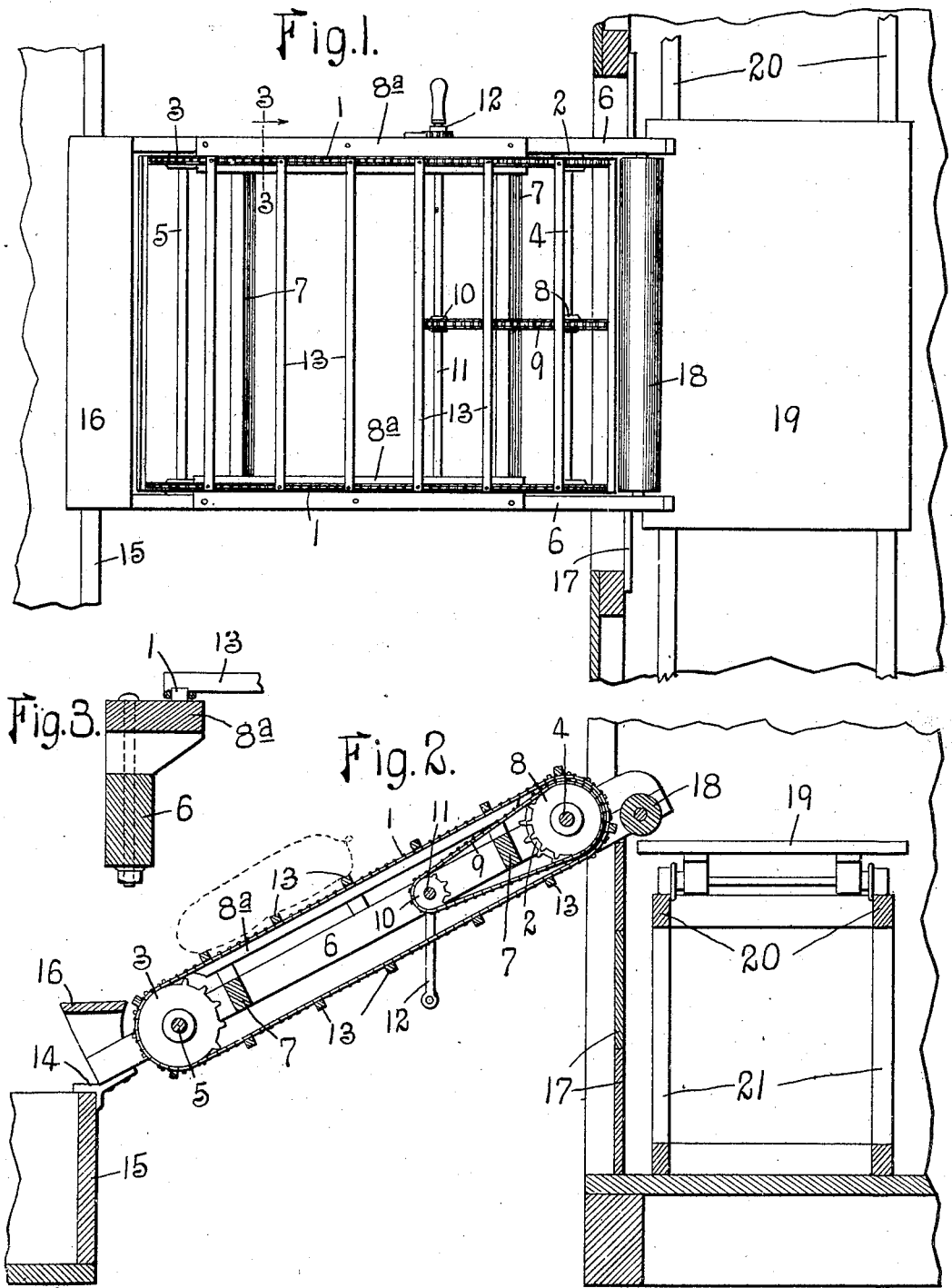

ALEXANDER CHAPIE, OF FLORISSANT, MISSOURI.

CAR-LOADING APPARATUS.

No. 836,435.　　　Specification of Letters Patent.　　　Patented Nov. 20, 1906.

Application filed March 26, 1906. Serial No. 308,067.

*To all whom it may concern:*

Be it known that I, ALEXANDER CHAPIE, a citizen of the United States, residing at Florissant, Missouri, have invented a certain new and useful Improvement in Car-Loading Apparatus, of which the following is a full, clear, and exact description, such as will enable others skilled in the art to which it appertains to make and use the same, reference being had to the accompanying drawings, forming part of this specification, in which—

Figure 1 is a plan view of an apparatus embodying the features of my invention. Fig. 2 is a longitudinal sectional view taken through approximately the center of the apparatus shown in Fig. 1, and Fig. 3 is a detail sectional view taken on the line 3 3 of Fig. 1.

This invention relates to devices for loading grain-cars; and the object of my invention is to provide a novel apparatus for conveying sacks of material from a wagon or from a platform into a grain-car and then carrying the sacks to any desired point in the interior of the car.

The apparatus which I have herein shown as representing the preferred form of my invention is intended to be used principally for loading a car with wheat and comprises a conveyer consisting of an endless chain or belt extending from the platform or wagon to the car-door opening, and located in the interior of the car is a truck which is mounted on tracks for receiving the sacks as they leave the conveyer and carrying them to either end of the car. Preferably the conveyer consists of a plurality of endless sprocket-chains provided with cross-slats on which the sacks are laid, and manually-operated means is provided for operating the chains. This conveyer is carried by a portable frame, the outer end of which rests on the side of the wagon containing the sacks of wheat and the inner end of which rests on the grain-door of the car, said door, as is well known, consisting of boards that are placed temporarily across the car-door opening.

Referring to the drawings, which represent the preferred form of my invention, 1 designates a plurality of sprocket-chains which travel on sprockets 2 and 3, mounted on shafts 4 and 5, which are carried by a portable frame. The frame comprises a plurality of side bars 6, connected together by cross-pieces 7 and provided with tracks 8$^a$, on which the endless sprocket-chains travel. The shaft 4 is provided with a driving-sprocket 8, which receives a driving sprocket-chain 9, that is actuated by a sprocket 10 on a shaft 11, which is journaled in the side bars 6, and one end of said shaft is provided with a crank 12 for imparting rotary movement thereto.

Transversely-extending slats 13 are connected to the sprocket-chains 1 to support the sacks of wheat, and the outer ends of the side bars are provided with supports 14, which rest on the side 15 of the wagon from which the sacks of wheat are to be removed. A platform 16 is also connected to the outer ends of the side bars, and in operation the sacks of material are manually lifted from the wagon and placed on this platform, from which they can be easily placed on the slats of the endless conveyer, which carries them from the wagon to the car. As previously stated, the inner end of the portable frame which carries the endless conveyer is supported by the grain-door consisting of boards 17, which are placed temporarily across the car-door opening.

At the inner end of the portable frame is mounted a roller 18, which is preferably located below the top of the endless conveyer, so that the sacks will drop from the conveyer onto the roller 18, from which they pass onto a truck 19, located in the interior of the car. This truck travels on a track consisting of rails 20, and said track may either be supported by a frame 21, or, if desired, the track may be supported at one end by a bar or brace which extends transversely of the car and rests on the temporary grain-doors 17.

In using my apparatus the endless conveyer and truck are arranged as shown in Fig. 2, one operator turning the crank to actuate the conveyer, one operator standing in the wagon to place the sacks on the conveyer, and one standing inside of the car at the inner end of the conveyer to place the sacks on the truck as they leave the conveyer. Said operator then gives the truck a slight push and it rolls to the end of the car, where another operator is standing to remove the sack from the truck, dump the contents of the sack into the car, and then give the truck a push to return it to the operator standing at the inner end of the conveyer.

From the foregoing description it will be seen that I have devised an apparatus which is of simple construction and which reduces greatly the time and amount of labor required to load a car with wheat.

Having thus described my invention, what I claim as new, and desire to secure by Letters Patent, is—

A device of the class described, comprising a portable frame consisting of side bars, a shaft journaled in each end of said frame, sprockets mounted on the outer ends of each shaft, sprocket-chains traveling on the coöperating sprockets of said shafts and having cross-slats connected thereto to form an endless conveyer, tracks for said chains rigidly connected to the side bars of the frame, a drive-sprocket connected to the upper shaft at the center thereof, a crank-actuated shaft journaled in the side frames and provided with a pinion and a sprocket-chain passing over said pinion and the drive-sprocket on the upper shaft for actuating the conveyer, a roller journaled in the upper end of said frame below the top of said conveyer, a platform connected to the lower end of said frame, and shouldered members 14 connected to the lower end of the frame for resting on a support; substantially as described.

In testimony whereof I hereunto affix my signature, in the presence of two witnesses, this 24th day of March, 1906.

ALEXANDER CHAPIE.

Witnesses:
  WELLS L. CHURCH,
  GEORGE BAKEWELL.